Oct. 13, 1959 J. BOCHAN 2,908,285
FLOW CONTROL DEVICE
Filed Sept. 20, 1956 2 Sheets-Sheet 1

INVENTOR.
JOHN BOCHAN
BY *H. F. Manleck, Jr.*
HIS ATTORNEY

Oct. 13, 1959

J. BOCHAN 2,908,285

FLOW CONTROL DEVICE

Filed Sept. 20, 1956

INVENTOR.
JOHN BOCHAN
BY H. F. Manbeck, Jr.
HIS ATTORNEY

2,908,285
Patented Oct. 13, 1959

2,908,285

FLOW CONTROL DEVICE

John Bochan, Louisville, Ky., assignor to General Electric Company, a corporation of New York Application September 20, 1956, Serial No. 611,065

5 Claims. (Cl. 137—513.7)

My invention relates to devices for controlling the flow through a pipe or other conduit and more particularly to such devices for maintaining a relatively constant outlet flow over a wide range of inlet pressures.

Flow control devices for regulating the flow through a conduit so as to produce a relatively constant output flow regardless of the inlet pressure are used in various types of apparatus. By way of example, these devices, hereinafter referred to simply as flow control devices, are used in drinking fountains, in water heating apparatus, and in lavatory and shower bath equipment. Further, they have found wide use in automatic washing machines for controlling the rate of filling of the water containing tub, particularly for preventing splashing or spraying out of the tub when abnormally high inlet pressures occur.

It is a general object of my invention to provide a new and improved flow control device which is extremely simple in construction and operation but yet is effective to maintain a relatively constant flow over a wide range of inlet pressures; and it is a more specific object of my invention to provide such a flow control device particularly suited for use in automatic washing machines.

In carrying out my invention I provide a flow control device having a passageway or chamber through which is passed the flow to be controlled. The passageway is closed at its outlet end by a rigid wall or plate which has a main outlet opening and at least one bypass outlet opening therethrough. A plurality of resilient spheres are disposed in the passageway on the upstream side of the plate in a side-by-side relationship and these spheres are so arranged that they cover at least partially the main outlet opening through the plate. The spheres cooperate with the main opening to provide a flow controlling action or effect upon changes in the inlet pressure to the passageway. As the inlet pressure increases, the spheres are deformed by it so that they block off progressively the main outlet opening. Thereby the flow through the main outlet is gradually decreased as the flow through the bypass outlet increases, and as a result a relatively constant output flow is maintained over a wide range of inlet pressures.

The subject matter which I regard as my invention is particularly pointed out and distinctly claimed in the concluding portion of the specification. My invention, however, both as to organization and method of operation, together with further objects and advantages thereof, may best be understood by reference to the following description taken in conjunction with the accompanying drawings in which:

Figure 1:
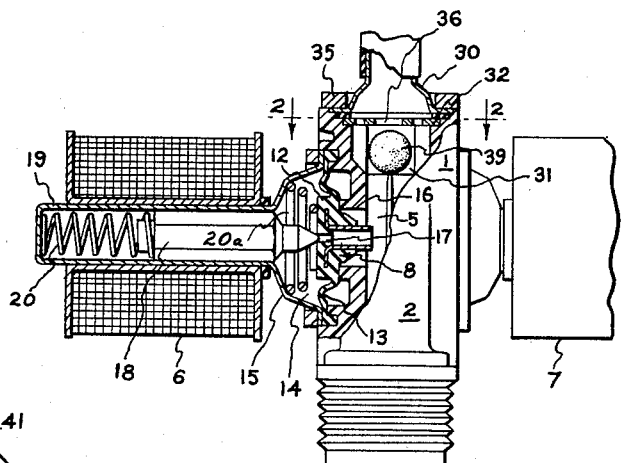
Fig. 1 is a side elevational view showing a flow control device embodying my invention and a combination shut-off and mixing valve incorporated within the same casing, the view being partially broken away and partially in section to show details of both the flow control device and the valve.

Referring now to the drawings I have shown therein a preferred embodiment of my new and improved flow control device 1 as incorporated within the same casing as a combination shut-off and mixing valve 2. I have shown the flow control device so arranged with the valve since this arrangement comprises one convenient way in which they may be used in an automatic washing machine. It will be understood, however, that even though they are incorporated within the same casing, the flow control device and the valve each performs its separate function in the same manner as if they were in completely separate casings. The flow control could be mounted at a point remote from the valve and would perform exactly the same function as it does when incorporated within the same casing as the valve in the manner shown. It will further be understood that my new and improved control device is not limited to use with the particular valve structure shown, either in the same casing or at a remote point, since any suitable valve means or conduit may be used to pass the flow to be controlled to my flow control device.

To explain first the manner in which the flow to be controlled is introduced to the flow control device 1, it will be seen that the combination shut-off and mixing valve 2 is adapted to pass water or other liquid from either or both of two inlets 3 and 4 to a mixing chamber 5 which leads to the flow control 1. The flow from the inlet 3 to the mixing chamber is controlled by a solenoid 6 and the flow from the inlet 4 is controlled by a solenoid 7. The two solenoids 6 and 7 specifically control the flow by controlling respectively the operation of two diaphragms 8 and 9 which are mounted within the valve casing. These diaphragms are both of the pilot actuated type and are identical in both construction and operation so that for simplicity and ease of description only the operation of the diaphragm 8 will be described in detail.

The inlet liquid from the inlet 3 reaches the diaphragm 8 by means of a longitudinally extending passageway 10 and a cross passageway 11 both formed in the valve casing or body. The diaphragm 8 includes a central or valve portion 12 and an outer flexible portion 13, and it is mounted within a closed chamber 14 formed between a cap 15 of the solenoid assembly and the left hand side surface of the valve body as viewed in Fig. 1. The valve portion 12, as shown, is adapted to seat on the outer flange of a passageway 16 leading from the chamber 14 to the mixing chamber 5, and the outer flexible portion 13 is secured at its outer periphery between the cap 15 and the valve casing. The diaphragm thereby not only divides the chamber 14 into inner and outer parts but also in its normal position shuts off the passageway 16 into the mixing chamber 5.

The diaphragm 8 includes a small bleed hole (not shown) through its outer flexible portion whereby the high pressure liquid in the passageway 11 and the inner portion of the chamber 14 may leak under pressure through the diaphragm into the outer portion of the chamber 14. As a result, provided that no liquid can escape through a central aperture 17 in the diaphragm, which is normally closed by a plunger 18, the diaphragm is subjected to a greater force on its outer surface than its inner surface. The area of the outer surface of the diaphragm exposed to the liquid pressure is greater than the inner surface so exposed, whereby the total force on the outer surface is greater. As a result the valve portion 12 of the diaphragm is held down tightly against the inlet flange of the passageway 16 to the mixing chamber so as to seal it off.

When, however, it is desired to pass flow from the inlet 3 through the passageway 16 into the mixing chamber, at that time the solenoid 6 is energized. The solenoid controls the plunger 18 which, as shown in Fig. 1, is arranged for longitudinal movement within an outer tubular extension 19 of the cap 15. The inner tapered end of the plunger 18 normally seats in the aperture 17 through the diaphragm 8 so that no leakage can occur therethrough. However, as soon as the solenoid is actuated, it pulls the plunger away from the diaphragm and opens the aperture 17. As a result the liquid in the chamber 14 immediately begins to leak through the aperture 17, and the aperture being larger than the bleed hole in the diaphragm, the liquid within the outer portion of the chamber 14 escapes at a fast rate into the mixing chamber 5. The pressure on the outer side of the diaphragm thereby becomes insufficient to hold the diaphragm seated on the inlet flange to the passageway 16 against the pressure on the inner side of the diaphragm, and the diaphragm rises or, more accurately, is forced off the flange. Thereby a direct passage is opened from the inlet 3 to the mixing chamber 5, and flow passes freely from the inlet 3 to the mixing chamber and the flow control device.

This flow continues so long as the solenoid 6 remains energized. When it is desired to shut off the flow, at the time the solenoid 6 is de-energized and the plunger 17 is returned into contact with the diaphragm by the biasing spring 20 disposed behind it. As soon as the plunger 18 closes the aperture 17, the pressure again begins to build up within the outer portion of the chamber 14. The liquid coming through the bleed hole in the diaphragm can no longer escape through the aperture 17 and thus the pressure begins to increase behind the diaphragm. In a short time the total force applied to the outer side of the diaphragm becomes greater than the force applied to the inner side of the diaphragm and thereby the valve portion 12 is forced to seat against the inlet flange to the passageway 16. This, of course, closes off the flow to the mixing chamber. It will be noted that a spring 20a is disposed between the cap 15 and the valve portion of the diaphragm to aid in this closing action.

As mentioned above, the action of the diaphragm 9 is identical with that of the diaphragm 8 so that no detailed description of it will be given herein. However, it will be noted that the diaphragm 9 is disposed within a suitable diaphragm chamber 21, and that passageways 22 and 23 lead from the inlet 4 to the chamber 21, specifically to the under side of the diaphragm. Also it will be seen that the central portion of the diaphragm normally seats on the flanged inlet of a passage 24 leading from the diaphragm chamber 21 to the mixing chamber so as to close off that passage. The diaphragm remains in this closed or seated position so long as the spring biased plunger 25 controlled by the solenoid 7 remains in the illustrated position closing the aperture 26 through the center of the diaphragm. However, when the solenoid 7 is energized so as to pick up the plunger 25, the diaphragm is at that time moved upwardly by the inlet pressure so as to allow free communication between the inlet 4 and the mixing chamber and the flow control device 1.

From the above it will be seen that when either or both of the solenoids 6 and 7 are energized, a flow of liquid is passed through the mixing chamber 5 to the flow control device 1. The flow control 1 is effective to regulate this flow so that a relatively constant flow is discharged from the outlet 30 of the device regardless of the inlet pressure over a wide range thereof. When the illustrated apparatus is incorporated in a washing machine, the filling of the machine is thereby accomplished at a steady rate even though the inlet water pressure varies from one filling to another, whereby splashing or spraying out of the tub is avoided.

The flow control device 1 is shown as mounted at the upper end of the valve 2, and it includes a passageway or chamber 31 which is in direct communication at its one end with the mixing chamber 5 of the valve. At the other or outlet end of the passageway 31 there is positioned a flat wall or plate 32 which extends completely across the passageway normal to its flow axis. The plate 32 in other words closes the outlet end of the passageway or chamber. The plate may be mounted in any suitable fashion but is shown (see Fig. 5) as having its outer edge disposed within an annular recess formed in the casing of the flow control. An annular rubber gasket 33 is positioned above the plate to prevent leakage past it, and the plate and the gasket are held in position by a flange 34 of the outlet tube 30. The flange 34 and thus the tube 30 as a whole are in turn secured on the casing by an outer retaining ring 35. The ring 35 may be secured to the casing by any suitable means as by bolts or screws (not shown).

In order to discharge the flow from the chamber 31 into the outlet tube 30 the plate 32 includes a main outlet means and a bypass outlet means. The main outlet means comprises a relatively large aperture 36 through the center of the plate and the bypass outlet means comprises a pair of smaller apertures 37 and 38 positioned on opposite sides of the main aperture. It is by controlling the flow through the main outlet aperture 35 that the flow control is effective to maintain a relatively constant flow as over a wide variation of inlet pressures. Upon an increase in the inlet pressure, that is, upon an increase in the pressure in the mixing chamber 5, the flow control is effective to gradually decrease the flow through the main outlet 36 as the flow through the bypass outlets 37 and 38 increases. Thereby a relatively constant output flow is maintained through the outlet tube 30.

Figure 2:
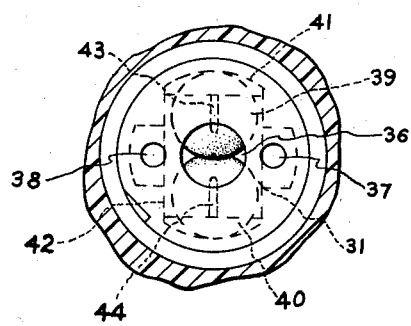
Fig. 2 is a sectional view taken on the line 2—2 of Fig. 1.
Figure 3:
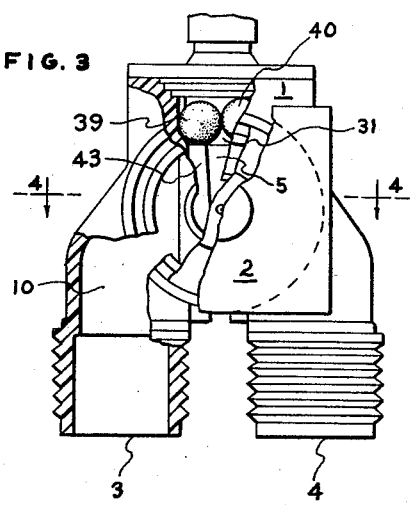
Fig. 3 is a front elevational view of the flow control device and the valve of Fig. 1, also broken away to show details.
Figure 4:
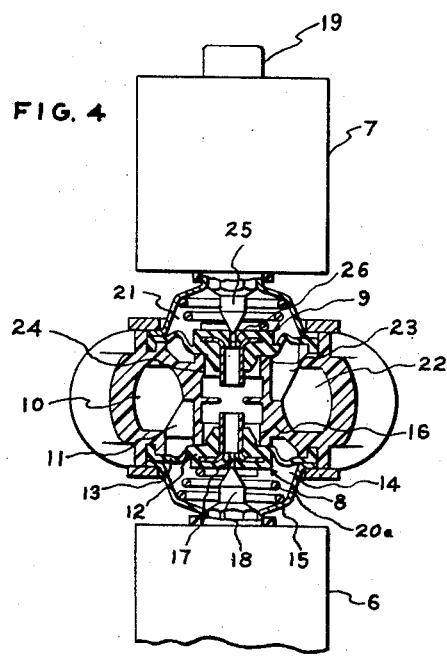
Fig. 4 is a sectional view taken on the line 4—4 of Fig. 3.
Figure 5:
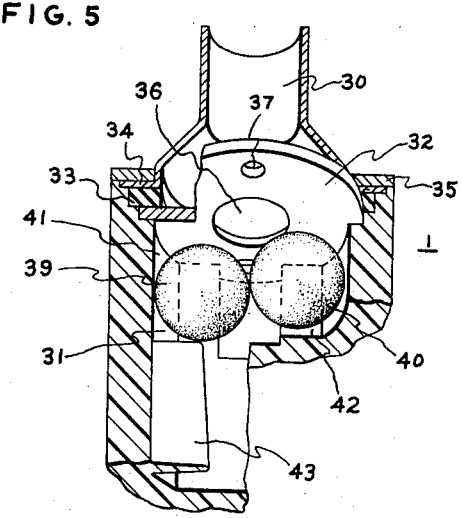
Fig. 5 is an isometric view of the flow control device alone, the view being broken away to show the inner construction thereof.

In order to control the flow through the main or central outlet aperture 36 there are provided within the flow-control passageway or chamber 31 a plurality of resilient, compressible spheres or balls 39 and 40. The spheres 39 and 40, which may for example be formed of rubber, are disposed on the upstream side of the plate 32 closely adjacent thereto, and they are arranged in a side-by-side relationship. In the drawings these spheres are shown in their inoperative state, that is, their state when no pressure is applied to them and no flow is passing through the flow control. In this inoperative state the balls partially cover the opening 36. However, as is best shown in Figs. 2 and 5 they do not block it off completely, there still being communication between it and the chamber 31. The bypass apertures 37 and 38 unlike the main outlet 36 are not covered in any way by the balls. Rather, positioning or holding means are provided in the flow control for keeping the balls spaced from the bypass apertures at all times. In the illustrated embodiment these positioning means comprise opposed recesses 41 and 42 in the walls of the chamber 31. The recesses 41 and 42 enclose a considerable portion of the balls whereby they cannot move from their illustrated positions so as to close the bypass orifices 37 and 38. In the illustrated embodiment it will be noted that the combined diameters of the two balls is slightly greater than the width between the outer ends of the recesses. However, it will be understood that this is only a matter of tolerance and that the balls could be exactly equal to the distance between the outer ends of the recesses or somewhat less than it without altering in any way the operation of the flow control device.

Since it is possible that the valve and flow control device may be mounted in a position wherein the flow control lies above the valve, it in fact being shown in such a position, means are therefore provided within the structure for preventing the balls from falling down into the mixing chamber 5. In the illustrated structure this means comprises vanes 43 and 44 formed on the wall of the mixing chamber. When the balls are in their inoperative position, they rest on these vanes and thereby cannot move downwardly into the mixing chamber. However, it will be understood that any suitable means can be used for retaining the balls within the flow control chamber 31.

The balls 39 and 40 control the flow through the device 1 by closing off more or less of the main aperture 36 in accordance with the inlet pressure to the chamber. As the inlet pressure to the chamber increases, the balls 39 and 40 are squeezed together and compressed down onto the plate 32. The higher the inlet pressure the harder the balls are forced together and flattened down onto the plate. As a result the higher pressure, the more effective the balls become to close off the main outlet 36. In other words they cover it more and more until at very high pressure they close it completely.

As the balls or spheres are compressed together and progressively close off the aperture 36, they attenuate or cut down the flow through that aperture. In other words as the inlet pressure increases, the action of the balls is effective to gradually decrease the flow through the main outlet aperture. The bypass apertures 37 and 38, however, since they are not blocked in any way by the balls, pass an increasingly greater flow as the pressure increases. The result of all of this is that a relatively constant output flow is obtained in the outlet tube 30 over a wide range of inlet pressures. The more the flow through the main aperture 36 is cut down, the more the flow is increased through the bypass apertures 37 and 38, and thereby a steady outlet flow is maintained.

Figure 6:
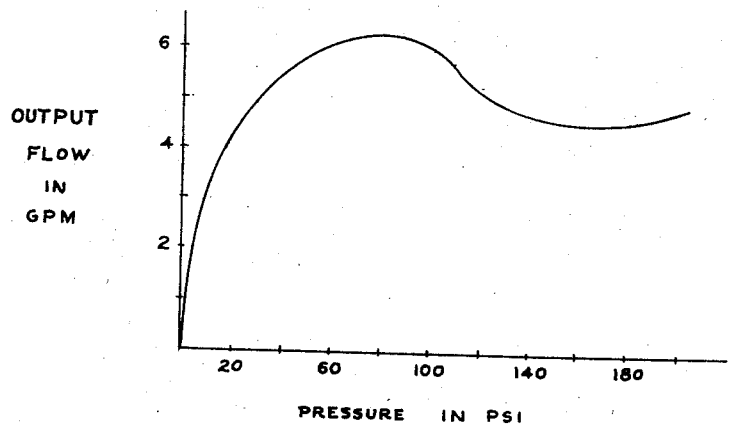
Fig. 6 is a graph showing the results obtained from one particular embodiment of the flow control device.

Referring now to Fig. 6, I have plotted therein in graph form the results obtained from one particular embodiment of my flow control device. The embodiment which gave these results included a plate, such as the plate 32, in which the control or main orifice 36 was of a diameter of 0.25 inch and the two bypass orifices 37 and 39 were of a diameter of 0.093 inch. The balls 39 and 40 positioned behind the plate were formed of hard rubber and were 0.32 inch in diameter and of 45 durometer hardness. In the graph the pressures applied at the inlet to the flow control device are plotted along the abscissa in pounds per square inch gauge, and the outlet flow from the device is plotted along the ordinate in gallons per minute. It will be noted that in the wide range of pressures from 20 pounds per square inch to 200 pounds per hundred square inch, the outlet flow was maintained in a narrow band between about 4.2 gallons per minute and about 6.4 gallons per minute. In other words over a 180 pounds per square inch range of inlet pressures, the outlet flow varied only slightly over 2 gallons per minute from its lowest to its highest value. With such a minor variation of outlet flow over such a wide range of inlet pressures, the device is particularly well suited for use in washing machines, lavatory and shower bath apparatus, drinking fountains, etc. Incidentally, almost all municipal water systems maintain a pressure at their domestic outlets somewhere within the 20 to 200 pounds per square inch range.

My new and improved flow control is extremely inexpensive to manufacture and assemble. The control plate and the resilient compressible balls are both inexpensive and readily obtainable items. They may, of course, be easily assembled together since there is no precision fitting or the like involved. Since there are no moving parts in the flow control, the compression of the balls providing the entire flow controlling action, the device is substantially fool proof in operation. It has been found that the balls will retain their resiliency over an extended period of time, and certainly far beyond the normal life of the apparatus, such as washing machines, drinking fountains, and the like, with which the flow control device is likely to be used.

While in accordance with the Patent Statutes I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of the invention.

What I claim as new and desire to secure by Letters Patent of the United States is:

1. A flow control device for maintaining a relatively constant rate of fluid flow over a range of inlet pressures, comprising a passageway through which the flow passes, a flat wall closing the outlet end of said passageway, said wall having a principal outlet opening of substantially smaller area than said principal outlet therethrough and at least one bypass outlet opening, a plurality of individual resilient spheres disposed side-by-side in said chamber on the upstream side of said wall, said spheres being arranged to cover said principal outlet opening at least partially and being effective to block off said principal outlet progressively as they are deformed by increasing inlet pressures thereby to maintain a relatively constant outlet flow, and means confining said spheres to cause them to contact each other in front of said principal outlet and to preclude movement of any one sphere into closing relation to said prinicpal outlet.

2. A flow control device for maintaining a relatively constant rate of fluid flow over a range of inlet pressures, comprising a passageway through which the flow passes, a rigid plate-like member extending across said passageway, said plate having a principal aperture and at least one bypass aperture of substantially smaller area than said principal aperture therethrough, a plurality of individual resilient compressible spheres disposed side-by-side in said passageway on the upstream side of said plate-like member and contacting each other in front of said principal aperture during flow to at least partially cover said principal aperture, said spheres being effective to block off said principal aperture progressively as they are flattened out by increasing inlet pressures, and positioning means for spacing said spheres relative to said bypass aperture to prevent the blocking thereof by said spheres, said positioning means further confining said spheres to preclude movement of any one sphere into closing relationship to said principal aperture.

3. A flow control device for maintaining a relatively constant rate of fluid flow over a range of inlet pressures, comprising a passageway through which the flow passes, a rigid plate member extending across the outlet end of said passageway, said plate member having a central aperture therein and a pair of substantially smaller side apertures, a pair of individual resilient spheres disposed side-by-side in said chamber on the upstream side of said plate and immediately adjacent thereof, said spheres contacting each other in front of said central aperture during flow to cover said central aperture at least partially and being effective to block off said central aperture progressively as they are deformed by increasing inlet pressures, thereby to maintain a relatively constant flow, and positioning means for spacing said spheres relative to said side apertures to prevent the blocking thereof by said spheres, said positioning means further precluding movement of any one sphere into closing relation to said central aperture.

4. A flow control device for maintaining a relatively constant rate of fluid flow over a range of inlet pressures, comprising a chamber through which the flow passes, a rigid plate member extending across the outlet end of said chamber, said plate member having a central aperture therein and a pair of substantially smaller side apertures, a pair of individual resilient spheres disposed side-by-side in said chamber on the upstream side of said plate and contacting each other in front of said central aperture during flow to at least partially cover said central aperture, said spheres being effective to block off said central aperture progressively as they are flattened by increasing inlet pressure thereby to maintain a relatively constant flow, and recess means in the wall of said chamber for holding said spheres spaced from said side apertures to prevent the blocking thereof by said spheres, said recess further precluding movement of any one sphere into closing relation to said central aperture.

5. A flow control device for maintaining a relatively constant rate of fluid flow over a wide range of inlet pressures, comprising a passageway through which the flow passes, a flat wall closing the outlet end of said passageway, said wall having principal outlet means and substantially smaller bypass outlet means therethrough, and a plurality of individual resilient members having curved surfaces and disposed side-by-side in said chamber on the upstream side of said wall, said resilient members with their curved surfaces contacting each other in front of said principal outlet means during flow to cover said principal outlet means at least partially, said curved surfaces of said resilient members being formed to flatten out gradually in response to increasing pressures whereby they are effective to block off said principal outlet means progressively as they are deformed by increasing inlet pressures, thereby to maintain a relatively constant outlet flow, and means confining said resilient members to cause them to contact each other in front of said principal outlet means and to preclude movement of any one resilient member into closing relation to said principal outlet means.

References Cited in the file of this patent

UNITED STATES PATENTS

| | | |
|---|---|---|
| 168,776 | Painter | Oct. 11, 1875 |
| 596,321 | Bulley | Dec. 28, 1897 |
| 1,065,023 | Blood | June 17, 1913 |
| 2,291,881 | Coffey | Aug. 4, 1942 |
| 2,301,096 | Truscott | Nov. 3, 1942 |
| 2,454,979 | Snell et al. | Nov. 30, 1948 |
| 2,754,910 | Derrick et al. | July 17, 1956 |

UNITED STATES PATENT OFFICE

CERTIFICATE OF CORRECTION

Patent No. 2,908,285                                                          October 13, 1959

John Bochan

It is hereby certified that error appears in the printed specification of the above numbered patent requiring correction and that the said Letters Patent should read as corrected below.

Column 6, lines 15 and 16, strike out "of substantially smaller area than said principal outlet" and insert the same after "opening" and before the comma in line 17, same column.

Signed and sealed this 12th day of April 1960.

(SEAL)
Attest:

KARL H. AXLINE
Attesting Officer

ROBERT C. WATSON
Commissioner of Patents